(12) United States Patent
Handelman (10) Patent No.: US 11,868,130 B2
(45) Date of Patent: Jan. 9, 2024

(54) SYSTEM AND METHOD FOR DECISION MAKING FOR AUTONOMOUS VEHICLES

(71) Applicant: Lakuruma Systems Ltd., Mevasseret Zion (IL)

(72) Inventor: Amir Handelman, Hod Hasharon (IL)

(73) Assignee: LAKURUMA SYSTEMS LTD., Mevasseret Zion (IL)

( * ) Notice: Subject to any disclaimer, the term of this patent is extended or adjusted under 35 U.S.C. 154(b) by 454 days.

(21) Appl. No.: 16/806,310

(22) Filed: Mar. 2, 2020

(65) Prior Publication Data

US 2020/0278677 A1 Sep. 3, 2020

Related U.S. Application Data

(60) Provisional application No. 62/812,641, filed on Mar. 1, 2019.

(51) Int. Cl.
*H04W 4/44* (2018.01)
*G06F 7/58* (2006.01)
(Continued)

(52) U.S. Cl.
CPC ............ *G05D 1/0088* (2013.01); *G06F 7/58* (2013.01); *G06N 5/04* (2013.01); *H04W 4/44* (2018.02)

(58) Field of Classification Search
CPC ......... H04W 4/40; H04W 4/027; H04W 4/46; H04W 72/005; H04W 76/14; H04W 76/40; H04W 4/026; H04W 4/12; H04W 52/04; H04W 72/1278; H04W 28/16; H04L 9/0852; H04L 9/0662; H04L 9/0861; H04L 9/0866; H04L 9/0643; H04L 2209/12; H04L 9/0858; H04L 9/0618; H04L 9/0869; H04L 9/0631; H04L 9/065; H04L 9/3066; H04L 2209/24; H04L 9/08; H04L 9/0891; H04L 2209/805; H04L 9/0819; H04L 9/0827; H04L 9/12; H04L 9/3231; H04L 9/3278; H04L 63/0428; H04L 63/061; H04L 9/0656; H04L 2209/08;
(Continued)

(56) References Cited

U.S. PATENT DOCUMENTS 7,040,435 B1 5/2006 Lesesky et al.
9,547,986 B1 1/2017 Curlander et al.
(Continued)

OTHER PUBLICATIONS

Huang, et al., "Secure Free-Space Optical Communication System Based on Data Fragmentation Multipath Transmission Technology," Optics Express, vol. 26, No. 10, 2018, China, pp. 13536-13542.
(Continued)

*Primary Examiner* — Djenane M Bayard
(74) *Attorney, Agent, or Firm* — M&B IP Analysts, LLC (57) ABSTRACT

A system and method for decision making for autonomous vehicles. The method includes determining if a decision scenario is present; generating a first random number; communicating the first random number to a receiver via visible light communication; receiving a second random number and determining a priority order based on the generated random numbers. The priority is communicated to all relevant units to determine the order in which the vehicles should proceed. An optical random generator may be used to generate the random number associated with each vehicle.

9 Claims, 5 Drawing Sheets

(51) Int. Cl.
*G05D 1/00* (2006.01)
*G06N 5/04* (2023.01)

(58) Field of Classification Search
CPC . H04L 2209/16; H04L 9/0625; H04L 9/0841; H04L 9/3236; H04L 9/3239; H04L 9/50; H04L 2209/80; H04L 2209/84; H04L 27/2278; H04L 27/3818; H04L 63/0457; H04L 63/0853; H04L 9/001; H04L 9/0637; H04L 9/0897; H04L 2209/34; H04L 2209/46; H04L 2463/082; H04L 63/083; H04L 7/0008; H04L 7/0075; H04L 9/0816; H04L 9/0838; H04L 9/0844; H04L 9/3013; H04L 9/0855; H04L 9/0825; H04L 63/0272; H04L 9/3226; H04L 9/3263; H04L 63/08; H04L 9/083; H04L 67/12; H04L 9/14; H04L 9/3234; H04L 9/0872; H04L 63/062; H04L 9/32; H04L 9/321; H04L 5/0091; H04L 9/3247; H04L 63/0435; H04L 9/3242; H04L 9/3271; H04L 63/123; H04L 2012/40215; H04L 2012/40273; H04L 5/0053; H04L 63/0869; H04L 2463/061; H04L 63/0281; H04L 63/0442; H04L 63/0884; H04L 9/3093; H04L 1/0057; H04L 1/0065; H04L 1/0075
See application file for complete search history.

(56) References Cited

U.S. PATENT DOCUMENTS

| | | | | |
|---|---|---|---|---|
| 10,070,311 B2* | 9/2018 | Lee | | H04L 9/3263 |
| 10,627,819 B1* | 4/2020 | Zhou | | B60Q 1/50 |
| 11,092,961 B2* | 8/2021 | Battles | | G05D 1/0214 |
| 2002/0198632 A1 | 12/2002 | Breed et al. | | |
| 2006/0288062 A1* | 12/2006 | Luo | | H04L 9/0852 |
| | | | | 708/250 |
| 2010/0195831 A1* | 8/2010 | Tanaka | | H04L 9/0858 |
| | | | | 380/279 |
| 2015/0279213 A1 | 10/2015 | Balter et al. | | |
| 2018/0089563 A1 | 3/2018 | Redding et al. | | |
| 2019/0104090 A1* | 4/2019 | Labonte | | H04L 49/252 |
| 2019/0113918 A1 | 4/2019 | Englard et al. | | |

OTHER PUBLICATIONS

Kim, et al., "Cooperative Unmanned Autonomous Vehicle Control for Spatially Secure Group Communications," IEEE Journal on Selected Areas in Communications, vol. 30, No. 5, 2012, pp. 870-882.

Li, et al., "All-Optical Fast Random Number Generator," Optics Express, vol. 18, No. 19, 2010, pp. 20360-20369.

Wei, et al., "High-Speed and Bias-Free Optical Random Number Generator," IEEE Photonics Technology Letters, vol. 24, No. 6, 2012, pp. 437-439.

Zhang, et al., "Vehicular Communication Networks in the Automated Driving Era," IEEE Communications Magazine, 2018, pp. 26-32.

Tomkewitsch, Dynamic Route Guidance and Interactive Transport Management with Ali-Scout, IEEE Transactions on Vehicular Technology, vol. 40, No. 1, Feb. 1991, pp. 45-50.

* cited by examiner

SYSTEM AND METHOD FOR DECISION MAKING FOR AUTONOMOUS VEHICLES

CROSS-REFERENCE TO RELATED APPLICATIONS

This application claims the benefit of U.S. Provisional Application No. 62/812,641 filed on Mar. 1, 2019, the contents of which are hereby incorporated by reference.

TECHNICAL FIELD

The present disclosure relates generally to autonomous vehicles, and more specifically to systems and methods of communication between autonomous vehicles and other vehicles or infrastructure.

BACKGROUND

Autonomous vehicles use a host of sensors and computing algorithms to determine their surroundings and calculate appropriate responses for various scenarios in order to safely operate on a shared road without the input of a human driver. Such vehicles are becoming more economically viable. As these vehicles become more popular, they not only must capture and analyze their real-world surroundings, such as road obstacles, traffic signals, and the like, but also have to communicate with other autonomous vehicles as well to prevent accidents and improve safety, a process known as vehicle-to-vehicle (V2V) communication. An essential ability to navigating a road with multiple autonomous vehicles is to successfully communicate decisions from one vehicle to another. For example, if two vehicles approach an intersection at the same time, one of the vehicles must be designated to continue through the intersection first before the other vehicle to prevent a collision or accident. Reliable and efficient communication between autonomous vehicles is necessary for the proper and safe functioning of autonomous vehicles.

Additionally, many scenarios require communication between infrastructure, such as traffic lights, electronic street signs, traffic cameras, and the like, and vehicles (vehicle-to-infrastructure communication). In many cases, having a central infrastructure unit configured to communicate directly with multiple vehicles allows for the most efficient determination of prioritization of vehicles. For example, if multiple vehicles approach an intersection at the same time, a traffic light positioned in middle of the intersection may be configured to identify each of the vehicles, calculate a desired order of priority of the vehicles, and relay the order to each vehicle to allow the vehicles to proceed in a safe and efficient manner.

Further, autonomous vehicles can provide additional safety measures when communication is used to determine certain driving parameters. For example, if multiple autonomous cars are traveling within a single lane of a highway, the spacing between the vehicles must be kept above a safe minimum distance. Relaying a current travel speed as well as many real-time factors, such as road grade, weather conditions, road obstacles, and the like, can greatly reduce the amount of time each vehicle needs to react to any parameter changes in other vehicles. If, for example, the leading vehicle senses an obstacle and slows down slightly, the desired change in speed can quickly be relayed to each of the other vehicles in the group, even before the change itself has been detected via the onboard sensors. In order for such communication to be most effective, the exchange of information must happen with minimal lag or delay.

While many autonomous and non-autonomous vehicles are equipped with communication equipment that may relay vehicle information and data to a receiver, the communication technology currently used in vehicles involves radio frequency communication, such as cellular wireless technology including the Global System for Mobile Communications (GSM) network, the Long-Term Evolution (LTE) network and the like. However, such technology requires a cellular tower to act as an intermediary relay to receive and transmit signals between vehicles and/or infrastructure. Using a central connection point requires extra time, which not only affects the efficiency of the communication system but can result in safety issues within the autonomous driving system. Additionally, system failures due to weather, power failure, malicious attacks or other unforeseen circumstances may affect communication that relies on wireless networks.

Data transfer rates using optical communication image sensors exceed the rate used by currently available dedicated short-range communication (DSRC) and offer a direct connection that does not rely on an external network. Thus, these systems are a desirable alternative to currently employed communication systems.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for decision making for autonomous vehicles, including: determining a decision scenario involving a first vehicle and at least a second vehicle; generating a first random number for the first vehicle; receiving a second random number generated for the at least a second vehicle; determining a priority of the first vehicle and the at least a second vehicle for the decision scenario based on the first random number and the second random number; and communicating the determined priority to the first vehicle and the at least a second vehicle.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Visible light communication (VLC) is a method of transmitting data using pattern embedded in light within the visible portion of the electromagnetic spectrum, such as via light emitting diodes (LEDs) or lasers. The LEDs or lasers are able to be turned on and off much faster than the human eye can detect, allowed for the transmission of binary data in the form of light pulses which cannot be detected by humans. This method of transmission allows for direct communication between two devices without requiring an intermediate cellular tower or service provider, allowing for faster and more efficient communication.

The various disclosed embodiments include a method and system for determining priority of vehicles using random number generation and visible light communication.

Figure 1:
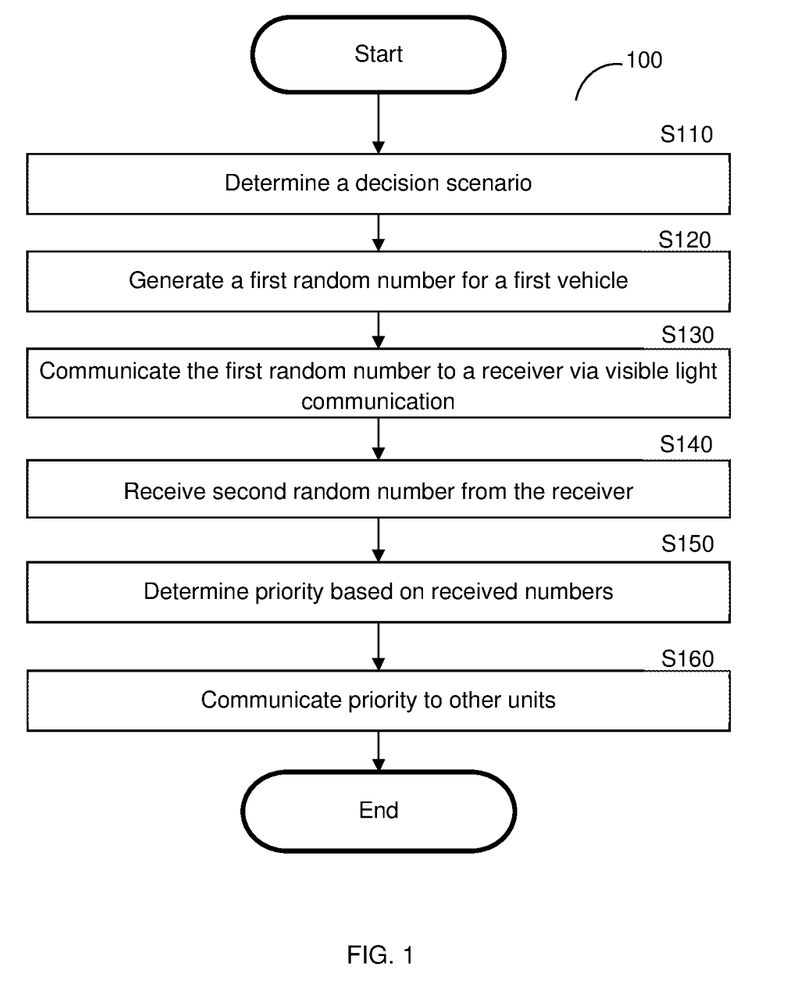
FIG. 1 a flowchart of a method for decision making for autonomous vehicle using visible light communication according to an embodiment.

FIG. 1 shows an example flowchart 100 of a method for decision making for autonomous vehicles using visible light communication (VLC). At S110, it is determined if a decision scenario is present. A decision scenario is a situation where a decision should be made regarding the movements of vehicles, and more specifically in terms of priority of vehicles with regard to other vehicles in close proximity. An example of a decision scenario is when two or more vehicles approach an intersection at the same time. In this example, a decision should be made as to which vehicle should proceed first, and the decision must be communicated to each of the involved vehicles.

In an embodiment, the decision can be made based on a number of parameters. Such decision parameters relate to the location of the vehicles and surrounding objects. Following the above example, the decision parameters may be based on the proximity of two or more vehicles to an intersection, to each other, to an infrastructure unit (e.g., a bridge), to a pedestrian, and the like.

As a further example of a decision scenario, two or more autonomous vehicles approach a single parking spot. A decision is made to determine which of the vehicles will be allowed to proceed to park in the spot, and which vehicle or vehicles must be turned away. The decision must be quickly communicated to each of the vehicles to allow the permitted vehicle to park, and to indicate to the other vehicle or vehicles to continue searching for a parking spot. The example is further discussed below regarding FIG. 4.

At S120, a first random number is generated for a first vehicle, such as an autonomous vehicle. The first random number is assigned to one specific vehicle as a unique identifier of that vehicle. In an embodiment, the random number is generated using an optical random number generator discussed below.

At S130, the generated first random number is communicated to a receiver via VLC. In an embodiment, the VLC involves sending pluses of visible light, such as LED pulses that blink faster than the human eye can detect. The pulses of light are received by a receiver, such as an optical receiver, that is configured to detect and interpret the pulses as information.

At S140, a second random number is received from the receiver. Where a V2V communication exists, the second random number is received directly from a second vehicle. In this embodiment, the second random number may be generated by the second vehicle when the second vehicle similarly determines a decision scenario. Where a V2I communication exists, an intermediary receiver receives the first random number from the first vehicle, and the second random number from the second vehicle. Thus, the intermediary receiver can receive multiple randomly generated numbers from multiple vehicles. The intermediary receiver sends the received random numbers to any nearby vehicles.

At S150, a priority order is determined based on the generated random numbers. For example, it may be determined that the decision scenario is an intersection, and that the second vehicle should proceed first, and the first vehicle should proceed second. The priority order can be determined based on predetermined qualities of the generated random numbers. For example, it may be predetermined that a random number having a lower value is given first priority over a random number having a higher value. In an embodiment, to avoid a scenario where a vehicle waits its turn for an extended period of time, the amount of non-priority decisions for the vehicle is analyzed, e.g., if a vehicle fails to receive priority based on its assigned random number three times and has been waiting for 5 minutes or more to proceed through the intersection or to enter a parking space, that vehicle will be marked to be given priority in the next decision scenario, regardless of the generated random number.

At optional S160, the priority is communicated to other vehicles. For example, the priority may be determined by a first vehicle and relayed to a second vehicle over VLC. In an alternative embodiment, an intermediary receiver receives a first random number from a first vehicle, and a second random number from a second vehicle. The priority may be determined by the intermediary receiver, or by a vehicle. Once the priority is determined, it is communicated to each of the nearby vehicles from the infrastructure unit.

Figure 2:
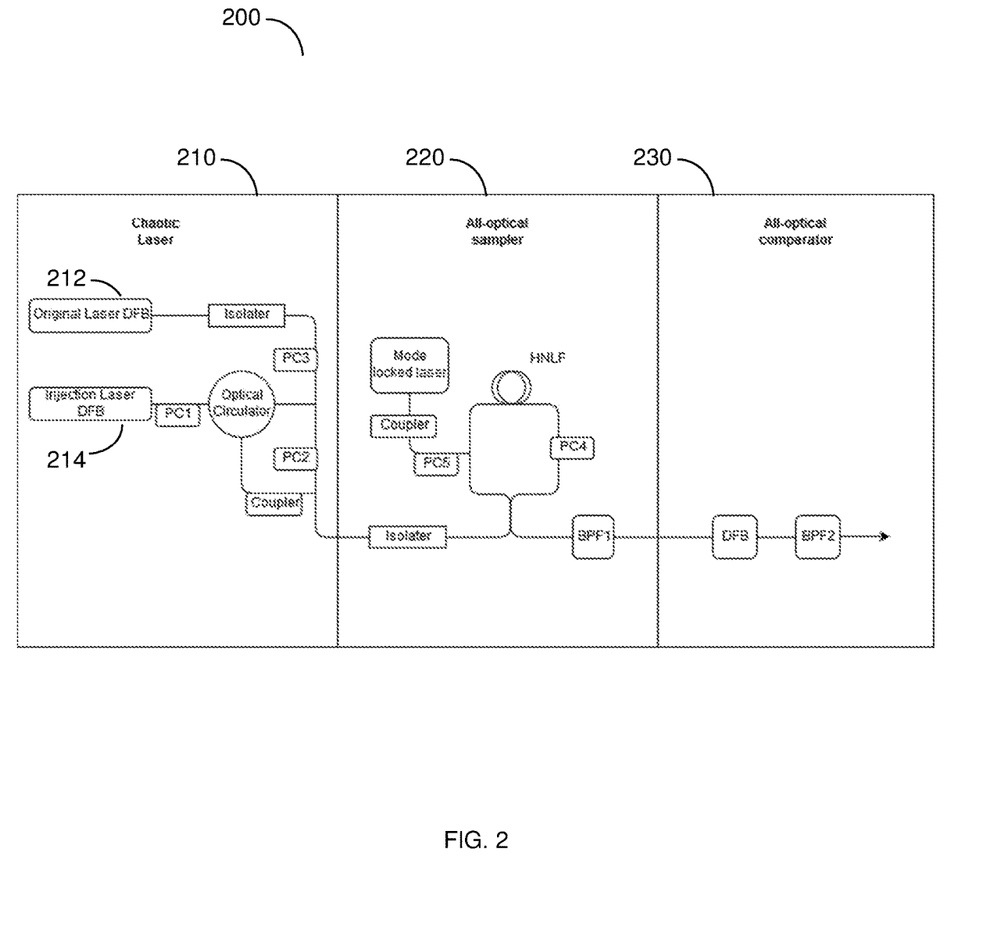
FIG. 2 is a diagram of an optical random number generator according to an embodiment.

FIG. 2 shows a schematic diagram of an optical random number generator 200 structured according to an embodiment. Generally, an optical random number generator relies on the randomness of an optical event to generate a random number. An optical event may include optical feedback detected from a chaotic laser. The optical random number generator (ORNG) 200 includes a chaotic laser 210, an optical sampler 220, and an optical comparator 230.

In an embodiment, the chaotic laser includes an original distributed feedback laser (original laser) 212 and an injection laser 214. The injection laser 214 can be used to enhance the bandwidth of the original laser 212. An optional variable attenuator may be connected to the lasers and used to adjust the power of the original laser 212.

The optical signal is relayed to the optical sampler 220, which includes an optical switch. In an embodiment, the optical switch includes various couplers and components, such as a 3 dB coupler (50/50), a WDM coupler, a modelocked laser, a length of highly nonlinear fiber (HNLF), polarization controllers (PC4 and PC5), an isolator and an optical bandpass filter (BPF1). The switch may include three ports: one control light input, one probe light input, and one switched output port of the probe light. The isolator is configured to prevent the back flow of the reflected probe light and the control light. The BPF1 removes the control light and transmits only the probe light. The output level is determined by the amount of the cross-phase modulation (XPM) exerted by the control light onto the probe light.

The light output from the sample is received by an optical comparator 230, which is configured to inject the sampled chaotic pulses into a preconfigured distributed feedback laser, e.g., one having a wavelength of $\pi/4$. After the pulse passes through a second bandpass filter (BPF2), it is output from the ORNG 200. A random number may then be generated based on the properties of the output pulse, such as the frequency of the pulse.

In an embodiment, the ORNG may be a Quantum Random Number Generation (QRNG) which "draw lots" for an X-bit binary number. Every vehicle is assigned its own number, which is sent to an infrastructure (V2I) and/or to other vehicles (V2V). Light is converted to an electronic signal received by the vehicles, which are configured to sorts all of the received signals using the electronic comparator.

The QRNG may employ a beamsplitter, configured to direct a received pulse of light toward one of two destination, where there is a 50% chance that the beam will be directed toward a first destination, e.g., a first sensor, and a 50% chance that the beam will be directed toward a second destination, e.g., a second sensor.

For example, if two vehicles are approaching a single intersection, each vehicle is configured to use a QRNG to generate a single value, e.g., a four bit value using binary light data where an illuminated sensor indicates value 1 and a non-illuminated sensor indicates a value of 0. Thus, a first vehicle may generate a value of 1011, while a second vehicle may generate a value of 1100. Both vehicles are then configured to send these values to the other vehicle, e.g., directly or through an intermediary infrastructure, via optical communication.

Each vehicle is then configured to compare the value it receives to its own generated value, e.g., via the comparator. In the above presented example, the value of the second vehicle is 12 in 4-bit binary, which is larger than the value of the first vehicle, which is 11 in 4-bit binary. In an embodiment, the first vehicle will be granted right of way in an intersection or for a parking spot. In a further embodiment, because the second vehicle loses priority, it is now assigned a bonus number, and at the next event requiring generation of a new random number, a 3-bit number is generated rather than a 4-bit number, e.g., 0XXX. The algorithm continues until a the second vehicle loses priority after four events, where at the fifth event, it will be automatically assigned 0000, and will be given priority over any other vehicle.

Figure 3:
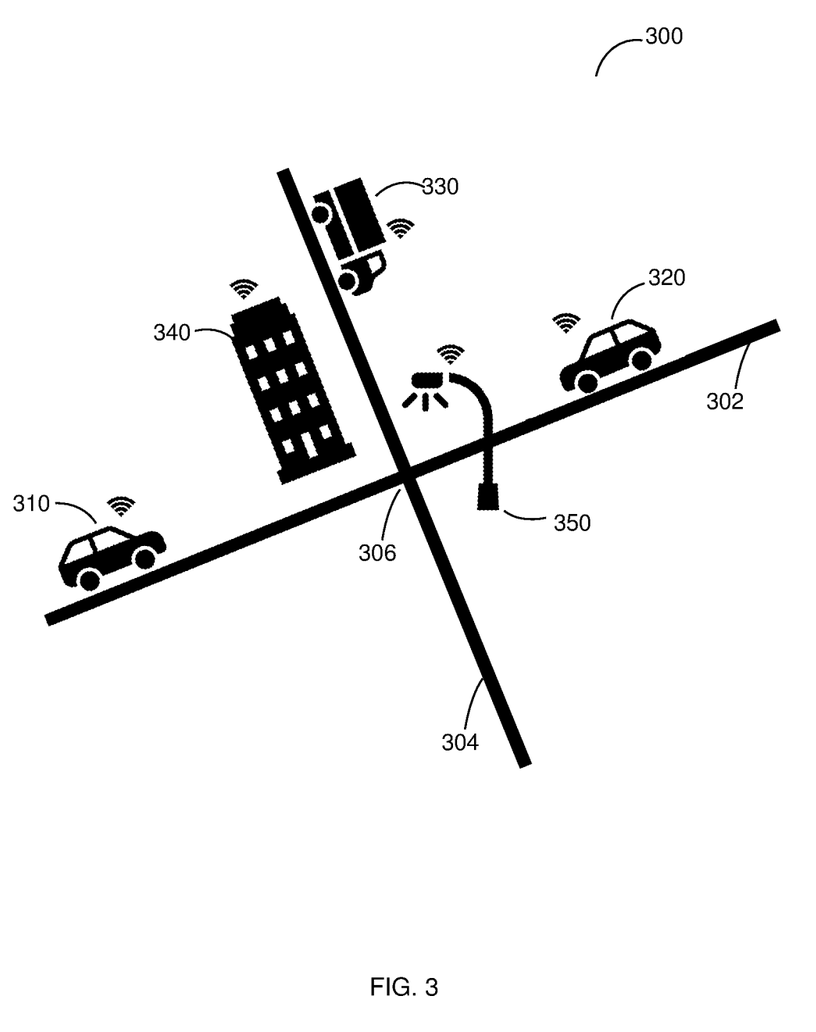
FIG. 3 is a schematic diagram of an intersection with various vehicles and infrastructure as an example scenario where the decision making method is employed.

FIG. 3 shows a schematic diagram 300 of an intersection 306 with various vehicles and infrastructure units as an example scenario where the decision making method is employed. The intersection 306 is formed at the juncture between a first road 302 and a second road 304. A first car 310 and a second car 320 are each approaching the intersection 306 from opposite directions on the first road 302, and a truck 330 is approaching the same intersection 306 on the second road 304. In addition to the vehicles on the road, various infrastructure units are located within a close proximity to the intersection 306. A building 340 and a street light 350 are positioned on opposing sides of the intersection.

In an embodiment of the present disclosure, each of the vehicles 310, 320 and 330 are equipped with an optical communication system that is configured to generate a random number and relay that number to each of the other vehicles. The optical communication system may include one or more light emitting diodes (LEDs) and an optical receiver, where the LEDs are configured to pulse in a manner that an optical receiver on another vehicle can detect the pulse. A processor may be coupled to the optical receiver and configured to translate the received optical pulses into data, such as a textual string or signature. In an embodiment, each vehicle includes a receiver, and the vehicles 310, 320 and 330 communicate directly with each other over VLC. In a further embodiment, the building 340 or street light 350 include a receiver and are able to receive and transmit VLC. Namely, the receiver of the infrastructure (e.g., building 340 or street light 350) is employed as an intermediary receiver that receives multiple generated random numbers and distributed the numbers to all nearby vehicles. In one embodiment, the priority is determined by one or more of the vehicles, while in a further embodiment, the priority is determined by the intermediary receiver and relayed to all nearby vehicles.

Each of the vehicles 310, 320 and 330 receives information regarding the priority of each vehicle in terms of how to proceed at the intersection 306 from another vehicle of from an infrastructure unit. Based on the received priority, a vehicle assigned first priority enters the intersection 306, followed by a vehicle assigned second priority, and finally followed by a vehicle assigned third priority.

Figure 4:
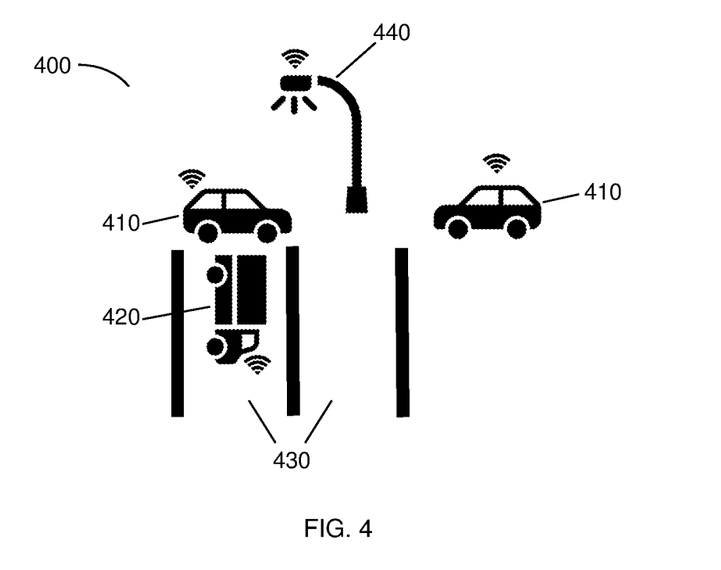
FIG. 4 is a schematic diagram of a parking lot as an example scenario where the decision making method is employed.

FIG. 4 is a schematic diagram of a parking lot 400 as an example scenario where the decision making method is employed. The parking lot 400 includes multiple parking spaces 430 and a connected infrastructure unit, e.g., a street light 440. Three cars are shown, including one car 420 that is currently parked in a first parking space 430 and two cars 410 that are approaching a second parking space 430. In an embodiment, each of the cars 410, 420 are equipped with an optical communication system that is configured to generate a random number and relay that number to each of the other vehicles. Additionally, the street light 440 may include an optical communication system to receive the generated random numbers and relay them to other vehicles, e.g., via a VLC communication link discussed above. When a decision scenario is presented, an order of sequence is determined based on the generated random numbers. For example, priority is given to one of the two approaching cars 410 to enter the remaining parking space 430, allowing one car to enter safely while the other car continues driving to find an alternative space.

Figure 5A:
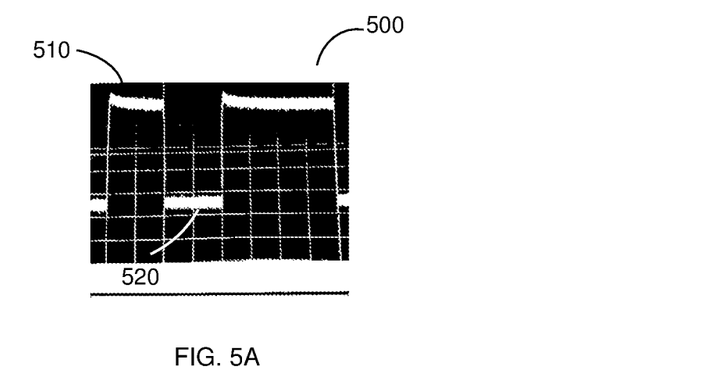
FIGS. 5A and 5B are graphic representations of optical communication sent between two vehicles according to an embodiment
Figure 5B:
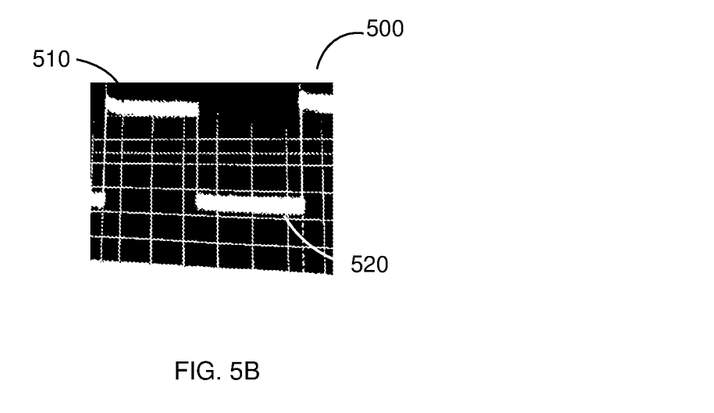

FIGS. 5A and 5B are graphic representations 500 of optical communication sent between two vehicles according to an embodiment. FIG. 5A shows a bit stream of 1011, and FIG. 5B shows a bit stream of 1100. Note that the upper signal 510 represents a value of 1 and the lower signal 520 represents a value of 0. These streams can be optically communicated between two vehicles, or between a vehicle and a receiving infrastructure unit, e.g., via quick light pulses are further discussed above.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal. As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for decision making for autonomous vehicles, comprising:
   determining a decision scenario involving a first vehicle and at least a second vehicle;
   generating, using an optical random number generator employing a Quantum Random Number Generation (QRNG), a first random number for the first vehicle;
   receiving a second random number generated for the at least a second vehicle over a visible light communication;
   determining a priority of the first vehicle and the at least the second vehicle for the decision scenario based on the first random number and the second random number over a vehicle-to-vehicle connection;
   responsive to the determined priority granting a right of way to the first vehicle, assigning a bonus number comprising a bit to the at least the second vehicle, wherein the bonus number is applied to generation of a next random number for the at least the second vehicle; and
   communicating the determined priority to the first vehicle and the at least the second vehicle over the vehicle-to-vehicle connection comprising the visible light communication.

2. The method of claim 1, wherein the first random number and the second random number are generated using the optical random number generator.

3. The method of claim 1, further comprising receiving the first random number and the second random number by an intermediary receiver configured to pass the first random number and the second random number to a plurality of vehicles located within an access range.

4. A non-transitory computer readable medium having stored thereon instructions for causing a processing circuitry to perform a process comprising:
   determining a decision scenario involving a first vehicle and at least a second vehicle;
   generating, using an optical random number generator employing a Quantum Random Number Generation (QRNG), a first random number for the first vehicle;
   receiving a second random number generated for the at least a second vehicle over a visible light communication;
   determining a priority of the first vehicle and the at least the second vehicle for the decision scenario based on the first random number and the second random number over a vehicle-to-vehicle connection;
   responsive to the determined priority granting a right of way to the first vehicle, assigning a bonus number comprising a bit to the at least the second vehicle, wherein the bonus number is applied to generation of a next random number for the at least the second vehicle; and
   communicating the determined priority to the first vehicle and the at least the second vehicle over the vehicle-to-vehicle connection comprising the visible light communication.

5. A system for decision making for autonomous vehicles, comprising:
   a processing circuitry; and
   a memory, the memory containing instructions that, when executed by the processing circuitry, configure the system to:
   determine a decision scenario involving a first vehicle and at least a second vehicle;
   generate, using an optical random number generator employing a Quantum Random Number Generation (QRNG), a first random number for the first vehicle;
   receive a second random number generated for the at least a second vehicle over a visible light communication;
   determine a priority of the first vehicle and the at least the second vehicle for the decision scenario based on the first random number and the second random number over a vehicle-to-vehicle connection;
   responsive to the determined priority granting a right of way to the first vehicle, assign a bonus number comprising a bit to the at least the second vehicle, wherein the bonus number is applied to generation of a next random number for the at least the second vehicle; and
   communicate the determined priority to the first vehicle and the at least the second vehicle over the vehicle-to-vehicle connection comprising the visible light communication.

6. The system of claim 5, wherein the first random number and the second random number are generated using the optical random number generator.

7. The system of claim 5, wherein the system is further configured to:
   receive the first random number and the second random number by an intermediary receiver configured to pass the first random number and the second random number to a plurality of vehicles located within an access range.

8. The method of claim 1, wherein the visible light communication involves sending pulses of a visible light indicating the second random number.

9. The method of claim 1, wherein in the next random number for the at least the second vehicle includes the bit from the bonus number indicating the priority.

\* \* \* \* \*